Patented July 2, 1940

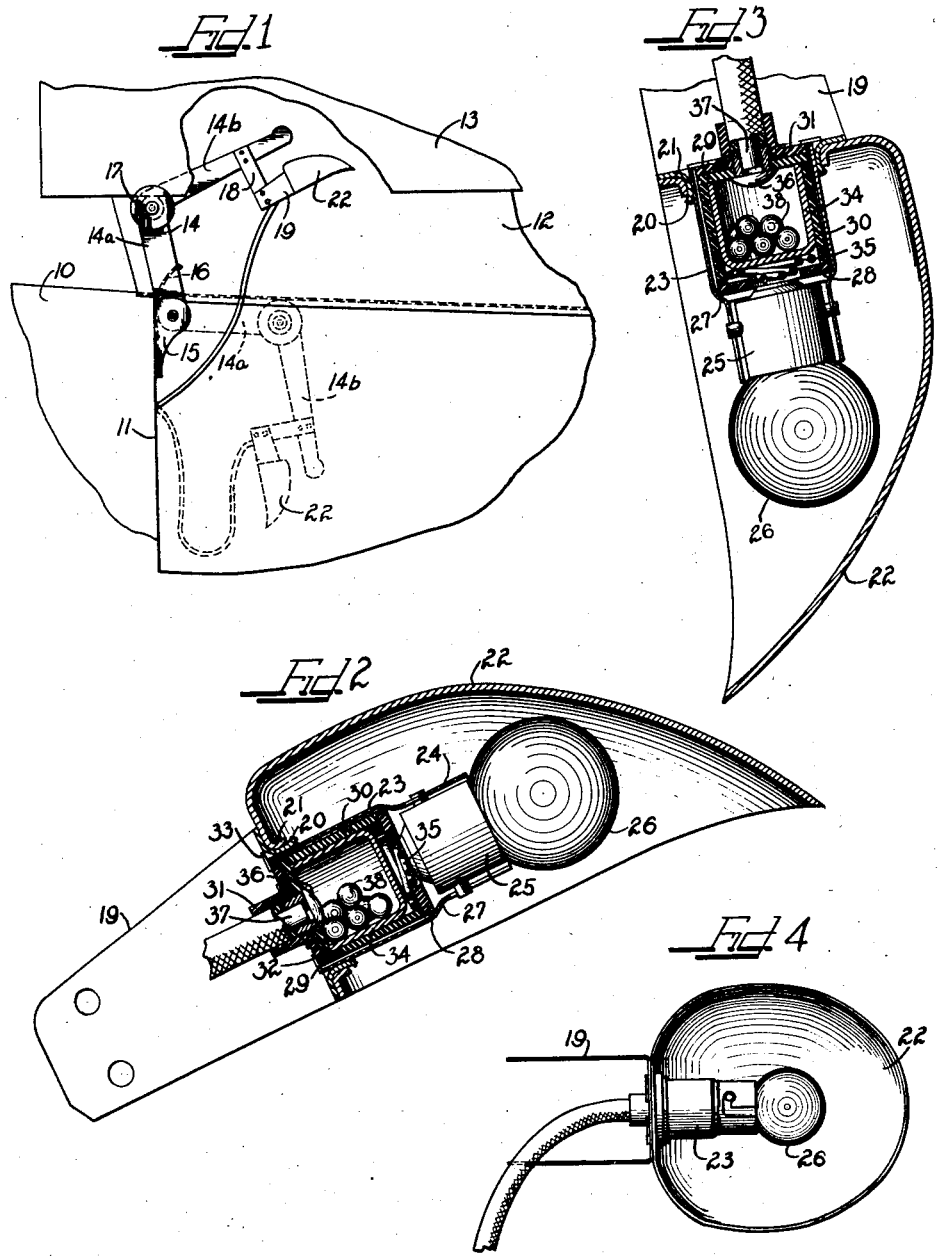

2,206,094

UNITED STATES PATENT OFFICE 2,206,094

AUTOMOBILE ENGINE LIGHT

John W. Hobbs, Springfield, Ill., assignor to John W. Hobbs Corporation, Springfield, Ill., a corporation of Delaware Application June 16, 1938, Serial No. 213,976

4 Claims. (Cl. 240—8.18)

The present invention relates in general to the automatic control of an electric lamp, and more particularly to an improved lamp socket construction and movable support therefor, wherein the socket embodies gravity actuated means to make and break an electric circuit to the lamp in response to the movements of the support.

This invention is readily adaptable for general use in the lighting of compartments and the like, where it may be desired to automatically illuminate the compartment when a closure member for the compartment is opened, and turn off the source of illumination when the closure member is moved to closed position.

The invention is especially useful when installed in connection with the engine compartment of an automobile. As so installed, the invention embodies the additional feature of being utilized for supporting the engine hood in raised position by means of a bracket which carries the source of illumination, this bracket in its movements to different positions controlling the operation of the lamp.

It is an object of the present invention to provide an improved lamp and movable supporting means therefor embodying an automatic switch for controlling the lamp in response to the movement of the supporting means to different positions.

A further object is to provide improved illuminating means for the engine compartment of an automotive vehicle, which is arranged to automatically be controlled in response to movements of the engine hood to raised and lowered positions.

A still further object is to provide a combination bracket for supporting an electric lamp and its control mechanism, wherein the bracket is arranged to automatically move to a hood supporting position, and the lamp control mechanism is arranged to close the circuit to the lamp in response to such movement of the bracket to hood supporting position.

Another object of the invention is to provide improved automatically controlled illuminating means for the engine compartment of a vehicle such as an automobile, wherein an electric lamp is automatically moved to positions of use and non-use, and turned "on" and "off" in such positions in response to the raising and lowering of the engine hood, and in which the lamp is provided with a protective shield so arranged that, when the lamp is in a position of non-use, the shield will protect the lamp and prevent it from becoming coated with dirt, oil and the like which is blown from the front to the rear of the engine compartment during the operation of the vehicle.

A further object of the invention is to provide an improved construction in a tiltable lamp socket of the type having self-contained circuit closing and opening means responsive to the tilting movements of the lamp.

The above, further and other objects of the present invention will be apparent from the following description and accompanying drawing:

The accompanying drawing illustrates an embodiment of the present invention, and the views thereof are as follows:

Figure 1 is a view in elevation showing a device embodying the features of the present invention as being applied to the engine compartment of an automotive vehicle. This view also illustrates the respective positions of the device with the hood of the engine compartment in raised position and in lowered position.

Figure 2 is an axial sectional view through the lamp socket and supporting structure, showing the relationship of the various parts when the lamp socket has been tilted to "on" position for supplying electrical current to the lamp;

Figure 3 is a similar view showing the relationship of the parts when the lamp socket is tilted to inoperative or "off" position; and Figure 4 is a plan view looking into the hood reflector, and showing the position of the lamp and socket therein.

The drawing will now be explained:

Referring to Figure 1, the hereindescribed invention is shown as being associated with the engine compartment of an automotive vehicle. As illustrated, this part of the vehicle comprises a cowl portion 10 which cooperates with a dash 11. This dash forms the rear of the engine compartment, and the compartment is arranged to be closed by a hood in the usual manner. The hood is of the usual construction comprising hingedly connected top and side panels 12 and 13, the top panel being hinged along its outer edge at the top center portion of the engine compartment.

Cooperatively associated with the vehicle hood is an arm 14 embodying angularly disposed portions 14ª and 14ᵇ. This arm is pivotally supported at one end on a bracket 15 which is affixed to the dash adjacent the upper portion of the engine compartment.

As thus mounted, the arm 14 may be swung vertically so as to occupy a position lying within the engine compartment, as shown in dotted line in Figure 1, or may be swung upwardly to dispose the arm outside of the engine compartment. The arm is normally moved to the latter position by means of a spring 16.

A rubber knob 17 is secured to the arm at the junction of the portions 14a and 14b. This knob projects laterally from the arm and forms a support or seat for the lowermost edge of the hood panel 13, when the hood is in raised position. Thus, the hood for the engine compartment is supported in raised position.

When the lower edge of panel 13 is removed from its seat on the knob 17, the hood may be lowered in the usual manner. In so doing, however, the under surface of the top panel 12 strikes against the free end of the arm 14 and causes it to move to the dotted line position as shown in Figure 1. In this position, the spring 16 is tensioned so that when the hood is again raised the arm automatically moves to hood supporting position. It will, therefore, be apparent that the movement of the arm is entirely automatic.

In the present invention advantage is taken of the movement of this arm to move an engine compartment light into most effective position, when the hood is raised, and also by utilizing a gravity actuated switch in connection with the lamp, illuminating the engine compartment becomes entirely automatic.

For this purpose, a novel socket and switch construction is utilized.

As shown in Figure 1, an extension 18 is secured at one end to the free end of the arm 14. The other end of this extension is secured to the legs of a U-shaped bracket 19 having its bridging portion provided with an opening defined by an outwardly extending flange 20. Surrounding the flange 20 is an inwardly deflected flange 21 which is formed in the base portion of a hood reflector 22. The hood and bracket 19 are secured together by deflecting the inner marginal edge of the flange 20 outwardly over the adjacent edge of flange 21, thus preventing removal of the hood reflector from the bracket.

A tubular shell 23 is axially insertable into the opening defined by the flange 20, this flange supporting the shell in a position wherein it projects under the hood reflector. The free end of this shell is contracted to form a portion 24, adapted to receive a base 25 of a lamp 26. The base portion 25 forms one contact for the lamp and electric connection is established therewith by the shell. In contracting this end of the shell, there is formed an intermediate shoulder 27 extending circumferentially around the shell.

An insulating washer 28 bears against this shoulder. At the other end of the shell, a similar washer 29 is disposed the washers 28 and 29 having their confronting peripheral margins abutting the respective associated ends of a tubular insulating member 30 which forms a lining in this part of the shell.

The washer 28, tubular lining 30 and washer 29 are retained within the shell by a sleeve terminal member 31 having its peripheral edge margin engaged by inwardly deflected finger portions 32 at this end of the shell. In addition to the inwardly deflected fingers, there are also a plurality of outwardly deflected finger portions 33 which serve as stops for limiting the movement of the shell axially in one direction, namely, in the direction toward the reflector hood.

Disposed within the insulating tube 30 is a cup-shaped metallic member 34 having its open end abutting the washer 29. The cup-shaped member is maintained in abutting relation with the washer 29 by means of a coil spring 35 which is disposed with one of its ends engaging the bottom of the cup-shaped member and its other end projecting through the opening of washer 28 to a position where it will be engaged by the central contact of the lamp.

A terminal member, in this case a tubular rivet 36, is staked to the washer 29 and is insulatingly supported with its head disposed in the cup-shaped member, but out of contact therewith.

A hot conductor 37 may be secured to this rivet as by soldering.

Within the cup-shaped member 34 are gravitationally responsive conductor members, such as balls 38, of such number and size as to electrically connect the head of the terminal member 36 with the cup-shaped member and thereby complete an electric circuit through the spring 35 to the central contact of the lamp 26, when the shell is tilted to suitable position, such as shown in Figure 2.

As shown in Figure 3, when the shell is tilted so that the lamp is disposed downwardly, the ball members gravitate to the bottom of the cup-shaped member and thus disconnect the hot conductor relative to the cup-shaped member, this action breaking or interrupting the circuit through the lamp.

It will be noted that the lamp socket and the associated reflector are so mounted with reference to the arm 14, that, when the hood is raised the socket will be in appropriate position to close the circuit to the lamp, whereby the engine compartment will be illuminated. On the other hand, when the hood is lowered, the lamp will be moved to the position shown in Figure 3, wherein the circuit to the lamp is interrupted and the lamp extinguished.

The reflector 22 is so arranged that, when the lamp is in a raised position of use above the engine compartment, the light rays from the lamp are reflected downwardly onto the engine. When the lamp is in its lowered position of non-use, it will be noted that the reflector is disposed with its outer non-reflecting surface facing the forward end of the engine compartment, and that the reflector in this position provides a protective shield for the lamp as well as its own reflecting surface, and keeps them from becoming covered with oil, grease, dirt and the like which are blown to the rear of the engine compartment during operation of the vehicle. Thus the lamp and reflecting surface of the reflector will remain clean and ready for efficient operation, whenever the occasion demands.

From the foregoing description, it will be apparent that the hereindescribed invention provides an improved lamp and movable supporting means therefor embodying an automatic switch for controlling the lamp in response to the movement of the supporting means to different positions; which is particularly adapted to automatically illuminate the engine compartment of an automotive vehicle when the hood is raised and extinguish the lamp when the hood is lowered; which provides an improved device of the hereindescribed character embodying a support which will automatically move to a position wherein it may be utilized for supporting the engine hood, when the hood is raised, and moved to a position within the engine compartment when the hood is lowered; and which provides an improved construction in a tiltable lamp socket of the type having self-contained circuit closing and opening means.

The invention has been described herein more or less precisely as to details, yet it is to be understood that the invention is not to be limited thereby, as changes may be made in the arrangement and proportion of parts, and equivalents may be substituted, without departing from the scope and spirit of the invention.

I claim as my invention:

1. Lighting means for a compartment including a swingable hood closure, said means comprising an elongate bracket member pivoted adjacent one end for substantially vertical swinging movement in a plane extending lengthwise of the compartment, said bracket being selectively movable to lowered and raised positions, a lamp carried by said member adjacent its free end, said lamp having a control circuit, switch means carried by said bracket for automatically opening and closing said circuit depending upon the selected position of said bracket, spring means tending to normally swing said bracket to said raised position when the hood closure is raised, and a seat member carried by said bracket adapted in the said raised position of the bracket to form a support for the raised hood.

2. Means for illuminating a compartment having a member adapted to be moved to opened and closed positions relative to said compartment, a spring actuated bracket arranged to automatically assume a position for supporting the member in open position in response to the movement of said member to open position, a lamp carried by and movable with said bracket, and switch means carried by the bracket and having contacts responsive to the movement of said bracket for controlling the energization and de-energization of said lamp.

3. Lighting means for a compartment including a hinged closure member, said means comprising a bracket pivoted adjacent one end within the compartment, for swinging movement in a plane at right-angles to the plane of movement of said closure to a first position and a second position, means normally biasing the bracket to said second position, said bracket being engageable by the closure and moved thereby to the first position, when the closure member is moved to closed position, a lamp carried by said bracket, said lamp having a control circuit, and a tilt switch movable with said bracket and lamp for automatically opening and closing said circuit in accordance with the position of said bracket.

4. Lighting means for a compartment including a hinged closure member, said means comprising a bracket pivoted adjacent one end within the compartment, for swinging movement to a first position and a second position, means normally biasing the bracket to said second position, said bracket being engageable by the closure and moved thereby to the first position, when the closure member is moved to closed position, a lamp carried by said bracket, said lamp having a control circuit, and a gravity actuated switch movable with said bracket for automatically opening and closing said circuit in accordance with the position of said bracket.

JOHN W. HOBBS.